US008542569B2

(12) United States Patent
Kanbe et al.

(10) Patent No.: US 8,542,569 B2
(45) Date of Patent: *Sep. 24, 2013

(54) HEAT-ASSISTED MAGNETIC RECORDING MEDIUM AND MAGNETIC STORAGE DEVICE

(75) Inventors: Tetsuya Kanbe, Ichihara (JP); Kazuya Niwa, Ichihara (JP); Katsuya Hara, Ichihara (JP)

(73) Assignee: Showa Denko K.K., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/396,234

(22) Filed: Feb. 14, 2012

(65) Prior Publication Data

US 2012/0207003 A1 Aug. 16, 2012

(30) Foreign Application Priority Data

Feb. 15, 2011 (JP) ................................. 2011-029974

(51) Int. Cl.
*G11B 3/70* (2006.01)
(52) U.S. Cl.
USPC .......................... 369/288; 428/828.1; 428/832
(58) Field of Classification Search
USPC ................... 369/288, 13.24, 13.32, 280, 283, 369/286; 428/832, 828.1, 836.1
See application file for complete search history.

(56) References Cited

U.S. PATENT DOCUMENTS

| 6,846,583 | B2* | 1/2005 | Inaba et al. | 428/831 |
| 7,521,137 | B2* | 4/2009 | Hohlfeld et al. | 428/831.2 |
| 8,270,286 | B2* | 9/2012 | Kanbe et al. | 369/288 |
| 8,279,739 | B2* | 10/2012 | Kanbe et al. | 369/288 |

FOREIGN PATENT DOCUMENTS

JP   11-353648   12/1999

OTHER PUBLICATIONS

Ikuya Tagawa and Yoshihisa Nakamura, Relationship Between High Density Recording Performance and Particle Coercivity Distribution, IEEE Transactions on Magnetics, Nov. 1991, p. 4975-4977, vol. 27, No. 6.

Yoshiko Tsuji, Suguru Noda, and Yukio Yamaguchi, Structure and magnetic property of *c*-axis oriented $L1_0$-FePt nanoparticles on TiN/*a*-Si underlayers, J. Vac. Sci. Technol. B 25 (6), Nov./Dec. 2007, American Vacuum Society.

* cited by examiner

*Primary Examiner* — Ali Neyzari
(74) *Attorney, Agent, or Firm* — Ditthavong Mori & Steiner, P.C.

(57) ABSTRACT

A heat-assisted magnetic recording medium includes a substrate, a plurality of foundation layers, and a magnetic layer. The plurality of foundation layers are provided on the substrate and include a first layer containing MnO. The magnetic layer is provided on the plurality of layers and includes an alloy as a main ingredient. The alloy has an $L1_0$ structure.

12 Claims, 6 Drawing Sheets

HEAT-ASSISTED MAGNETIC RECORDING MEDIUM AND MAGNETIC STORAGE DEVICE

CROSS-REFERENCES TO RELATED APPLICATIONS

The present application claims priority under 35 U.S.C. §119 to Japanese Patent Application No. 2011-029974, filed Feb. 15, 2011. The contents of this application are incorporated herein by reference in their entirety.

BACKGROUND OF THE INVENTION

1. Field of the Invention

The present invention relates a heat-assisted magnetic recording medium and a magnetic storage device.

2. Discussion of the Background

Heat-assisted recording, in which a medium is irradiated with near-field light or the like to locally heat the surface and the magnetic coercive force of the medium is thereby reduced to write on the medium, is attracting attention as a next-generation recording mode which can achieve a surface recording density in the order of 1 Tbit/inch$^2$. As heat-resist recording media, those employing an FePt alloy having an $L1_0$ type crystal structure in a magnetic layer are used. The above-mentioned FePt alloy has a high magnetocrystalline anisotropy Ku in the order of $10^6$ J/m$^3$, and therefore the magnetic particle size can be reduced to about 6 nm or less while maintaining heat stability. Medium noises can be thereby reduced while maintaining heat stability.

For obtaining a heat-assisted recording medium having a high perpendicular magnetic anisotropy, the $L1_0$ type FePt alloy used in a magnetic layer should have a good (001) orientation. For achieving this, an appropriate material should be used in a foundation layer. For example, Japanese Patent Laid-Open Publication No. 11-353648 discloses that an FePt magnetic layer shows a (001) orientation by using an MgO foundation layer. MgO has an NaCl structure, with its lattice constant being 0.421 nm, which is close to the a axial length of an FePt alloy having an $L1_0$ structure. Therefore, by forming an FePt magnetic layer on an MgO foundation layer which is (100)-oriented, the magnetic layer can be made to have a (001) orientation. Furthermore, J. Vac. Sci. Technol. B 25 (6), 1892-1895 (2007) discloses that an FePt magnetic layer shows a (001) orientation by using a TiN foundation layer. Like MgO, TiN has an NaCl structure and its lattice constant is close to that of MgO. Therefore, as in the case of MgO, the FePt magnetic layer can be made to have a (001) orientation.

SUMMARY OF THE INVENTION

According to one aspect of the present invention, a heat-assisted magnetic recording medium includes a substrate, a plurality of foundation layers, and a magnetic layer. The plurality of foundation layers are provided on the substrate and include a first layer containing MnO. The magnetic layer is provided on the plurality of layers and includes an alloy as a main ingredient. The alloy has an $L1_0$ structure.

According to another aspect of the present invention, a magnetic storage device includes the heat-assisted magnetic recording medium, a magnetic recording medium driving device, a magnetic head, a magnetic head driving device and a record regeneration signal processing device. The magnetic recording medium driving device rotates the heat-assisted magnetic recording medium. The magnetic head includes a laser generator to generate a laser beam, a near-field light generator and a waveguide. The near-field light generator is mounted at an end of the magnetic head and generates near-field light which heats the heat-assisted magnetic recording medium upon reception of the laser beam. The waveguide guides the laser beam to the near-field light generator. The magnetic head driving device moves the magnetic head.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
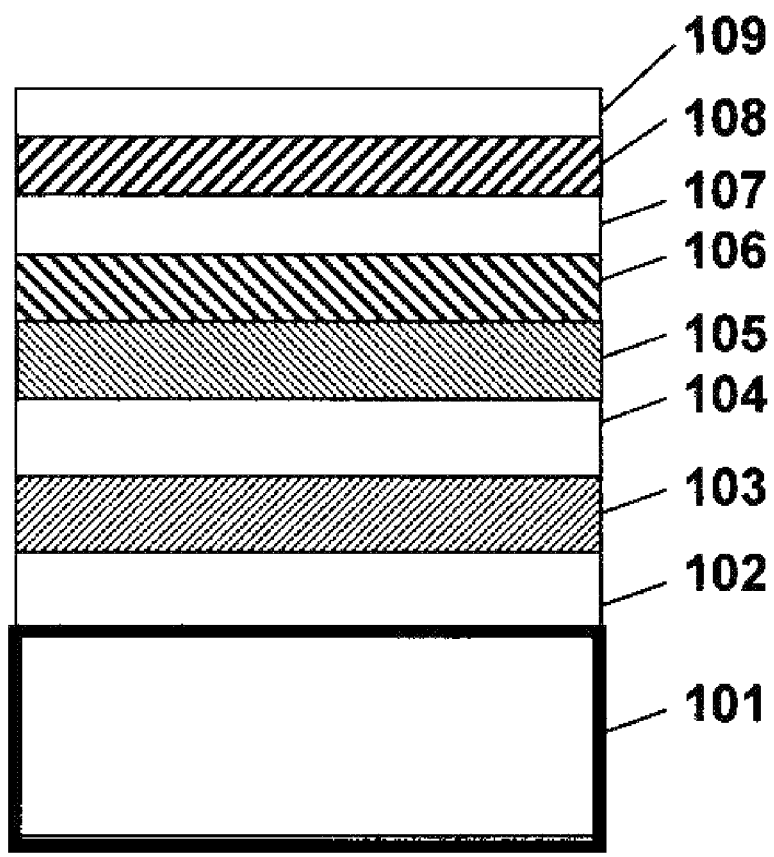
FIG. 1 is a drawing showing one example of the layer structure of a magnetic recording medium in an embodiment of the present invention.

The embodiments will now be described with reference to the accompanying drawings, wherein like reference numerals designate corresponding or identical elements throughout the various drawings.

The heat-assisted magnetic recording medium and the magnetic storage device in the embodiments of the present invention are as follows:

(1) a heat-assisted magnetic recording medium including a substrate, a plurality of foundation layers formed on the substrate, and a magnetic layer having as a main ingredient an alloy having an $L1_0$ structure, wherein at least one of the foundation layers contains MnO;

(2) the heat-assisted magnetic recording medium as set force in (1), wherein the foundation layer containing MnO is formed on Cr, or a foundation layer having a BCC structure, which contains Cr as a main ingredient and at least one of Ti, V, Mo, W, Mn and Ru;

(3) the heat-assisted magnetic recording medium as set force in (1), wherein the foundation layer containing MnO is formed on Cr, or a foundation layer having a BCC structure, which contains Cr as a main ingredient and at least one of Ti, V, Mo, W, Mn and Ru and further contains at least one of B and C;

(4) the heat-assisted magnetic recording medium as set force in (1), wherein the foundation layer containing MnO is formed on Mo, W, Ta, Nb, or a foundation layer having a BCC structure, which contains the above-mentioned elements and has a lattice constant of 0.3 nm or greater;

(5) the heat-assisted magnetic recording medium as set force in (1), wherein the foundation layer containing MnO is formed on a foundation layer having a B2 structure and consisting of NiAl or RuAl;

(6) the heat-assisted magnetic recording medium as set force in (1), wherein the foundation layer containing MnO is formed on a foundation layer consisting of MgO;

(7) the heat-assisted magnetic recording medium as set force in (6), wherein the foundation layer consisting of MgO is formed on Cr, or a foundation layer having a BCC structure, which contains Cr as a main ingredient and at least one of Ti, V, Mo, W, Mn and Ru;

(8) the heat-assisted magnetic recording medium as set force in (6), wherein the foundation layer consisting of MgO is formed on Cr, or a foundation layer having a BCC structure, which contains Cr as a main ingredient and at least one of Ti, V, Mo, W, Mn and Ru and further contains at least one of B and C;

(9) the heat-assisted magnetic recording medium as set force in (6), wherein the foundation layer consisting of MgO is formed on Mo, W, Ta, Nb, or a foundation layer having a BCC structure, which contains the above-mentioned elements and has a lattice constant of 0.3 nm or greater;

(10) the heat-assisted magnetic recording medium as set force in (6), wherein the foundation layer consisting of MgO is formed on a foundation layer having a B2 structure and consisting of NiAl or RuAl;

(11) the heat-assisted magnetic recording medium as set force in any one of (1) to (10), wherein the magnetic layer has as a main ingredient an FePt or CoPt alloy having an $L1_0$ structure and contains at least one oxide or element selected from $SiO_2$, $TiO_2$, $Cr_2O_3$, $Al_2O_3$, $Ta_2O_5$, $ZrO_2$, $Y_2O_3$, $CeO_2$, MnO, TiO, ZnO and C; and

(12) a magnetic storage device including a magnetic recording medium, a driving section for rotating the magnetic recording medium, a laser generating section for heating the magnetic recording medium, a waveguide which guides a laser beam generated from the laser generating section to the end of a head, a magnetic head having a near-field light generating section mounted at the end of the head, a driving section for moving the magnetic head, and a record regeneration signal processing system, wherein the magnetic recording medium is the heat-assisted medium as set forth in any one of (1) to (11).

According to the embodiments of the present invention, there is achieved a heat-assisted recording medium in which a magnetic layer has a good regularity and a (001) orientation and which has a high magnetic coercive force, and a magnetic storage device using the heat-assisted recording medium can be provided.

In the embodiments of the present invention, a magnetic recording medium includes a substrate, a plurality of foundation layers formed on the substrate, and a magnetic layer having as a main ingredient an alloy having an $L1_0$ structure, wherein at least one of the foundation layers contains MnO. In the embodiments of the present invention, by employing such a configuration, the MnO foundation layer is (100)-oriented, and a magnetic layer consisting of an FePt alloy is formed on the (100)-oriented MnO foundation layer at a high temperature of 500 to 600° C. or higher, whereby the FePt alloy can have a good $L1_0$ regularity and a (100) orientation.

Furthermore, in the embodiments of the present invention, it is desirable that the MnO foundation layer be formed on (100)-oriented Cr or a (100)-oriented Cr alloy foundation layer for the MnO foundation layer to have a (100) orientation. As a Cr alloy, CrTi, CrV, CrMo, CrW, CrMn, CrRu or the like may be used. B and C may also be added to these alloys. This allows reversal field distribution SFD to be considerably reduced. It is desirable that the above-mentioned Cr or Cr alloy foundation layer be formed on a seed layer consisting of an amorphous alloy such as, for example, Ni-50 at % Ta or Ni-50 at % Ti at a high temperature of 150° C. or higher. This allows the Cr or Cr alloy foundation layer to have a good (100) orientation. The above-mentioned amorphous seed layer is not specifically limited as long as it is an amorphous alloy such as a Co-50 at % Ti, Co-50 at % Ta or Cr-50 at % Ti alloy.

The MnO foundation layer may also be formed on a (100)-oriented NiAl alloy or RuAl alloy foundation layer having a B2 structure. In this case also, MnO has a (100) orientation by epitaxial growth. Like the Cr foundation layer, the NiAl foundation layer and the RuAl foundation layer can be made to have a (100) orientation by forming the layers on an amorphous alloy foundation layer. In this case, the heating of a substrate may be absent, but it is desirable to heat the substrate at 150° C. or higher in order to have a good (100) orientation.

MnO may be formed on a (100)-oriented foundation layer consisting of Mo, W, Ta, Nb, or an alloy containing these elements and having a BCC structure. In this case, it is desirable that the lattice constant of the above-mentioned BCC alloy be 0.3 nm or greater. Consequently, a tensile stress can be introduced into an $L1_0$ type FePt alloy in the magnetic layer via the MnO foundation layer, thus making it possible to further improve the regularity. The above-mentioned foundation layer consisting of Mo, W, Ta, Nb, or a BCC alloy containing these elements and having a lattice constant of 0.3 nm or greater is hereinafter referred to as a stress introducing layer. The stress introducing layer is required to have a (100) orientation, and therefore it is desirable to form the layer on a (100)-oriented Cr foundation layer, Cr alloy foundation layer, NiAl foundation layer or RuAl foundation layer.

Further, the MnO foundation layer may be formed on a (100)-oriented MgO foundation layer. For the MgO foundation layer to have a (100) orientation, the MgO foundation layer may be formed on the (100)-oriented Cr foundation layer, Cr alloy foundation layer, NiAl foundation layer or RuAl foundation layer. The stress introducing layer may also be formed between the MgO foundation layer and the (100)-oriented Cr foundation layer, Cr alloy foundation layer, NiAl foundation layer or RuAl foundation layer. In this case also, a tensile stress can be introduced into an $L1_0$ type FePt alloy in the magnetic layer via the MgO foundation layer and the MnO foundation layer formed thereon, thus making it possible to further improve the regularity.

For the MnO foundation layer in the embodiments of the present invention, Mn may be formed in an atmosphere of a mixed gas of argon and oxygen, or a Mn-50 at % O composite target may be used. It is desirable that the MnO foundation layer have an NaCl structure, but MnO crystals distorted into tetragonal, orthorhombic, and trigonal crystals and the like may coexist as long as epitaxial growth of $L1_0$ type FePt formed on the MnO foundation layer is not significantly hindered. When MnO has a tetragonal or orthorhombic crystal structure, (010) and (001) planes should be distinguished from the (100) plane, but concerning MnO, these plane indices are all described as the (100) plane. Furthermore, $MnO_2$, $Mn_2O_3$ and $Mn_3O_4$ formed by excess oxygen at the time of formation of an MnO film may coexist as long as epitaxial growth of $L1_0$ type FePt is not significantly hindered.

In heat-assisted recording, if the speed of cooling a magnetic layer heated at the time of recording is low, the magnetization transition range expands to degrade SNR, and therefore the magnetic layer should be cooled quickly. Therefore, it is desirable to form a heat sink layer consisting of a material having a high heat conductivity. For the heat sink layer, Cu, Ag, Al, Au or an alloy having these elements as a main ingredient can be used.

A soft magnetic foundation layer may also be formed. For the soft magnetic foundation layer, amorphous alloys such as CoTaZr, CoFeTaB, CoFeTaSi and CoFeTaZr, microcrystalline alloys such as FeTaC and FeTaN, and polycrystalline alloys such as NiFe may be used. The soft magnetic foundation layer may be a monolayer film consisting of the above-mentioned alloys, or may be a laminated film which includes layers antiferromagnetically bonded with an Ru layer of appropriate thickness held therebetween.

For the magnetic layer, it is desirable to use an $L1_0$ type FePt alloy or an $L1_0$ type CoPt alloy. For reducing exchange coupling between crystal grains, it is desirable to add $SiO_2$, $TiO_2$, $Cr_2O_3$, $Al_2O_3$, $Ta_2O_5$, $ZrO_2$, $Y_2O_3$, $CeO_2$, MnO, TiO, ZnO or C as a grain boundary phase material.

EXAMPLE 1

FIG. 1 shows one example of the layer structure of a magnetic recording medium prepared in this example. In this example, a 5 nm Ni-37 at % Ta adhesive layer 102, a 50 nm Cu-0.5 at % Zr heat sink layer 103 and a 5 nm Ni-50 at % Ti foundation layer 104 were formed on a glass substrate, and the substrate was heated to 220° C. Thereafter, a 10 nm Cr-5 at % Ti foundation layer 105 and a 3 nm MnO foundation layer 106 were formed, and the substrate was heated again to 480 to 640° C., followed by forming a 15 nm (Fe-47 at % Pt-3 at % Cu)-50 at % C magnetic layer 107 and a 5 nm Co-20 at % Cr-16 at % Pt-10 at % B cap layer 108. Further, a 3.2 nm DLC film 109 was formed as a protective film. Here, the MnO foundation layer was formed by DC-discharging an Mn target in an atmosphere of a mixed gas of Ar and oxygen. As a comparative example, a medium was prepared in which a 3 nm MgO foundation layer was formed instead of an MnO foundation layer.

Figure 2:
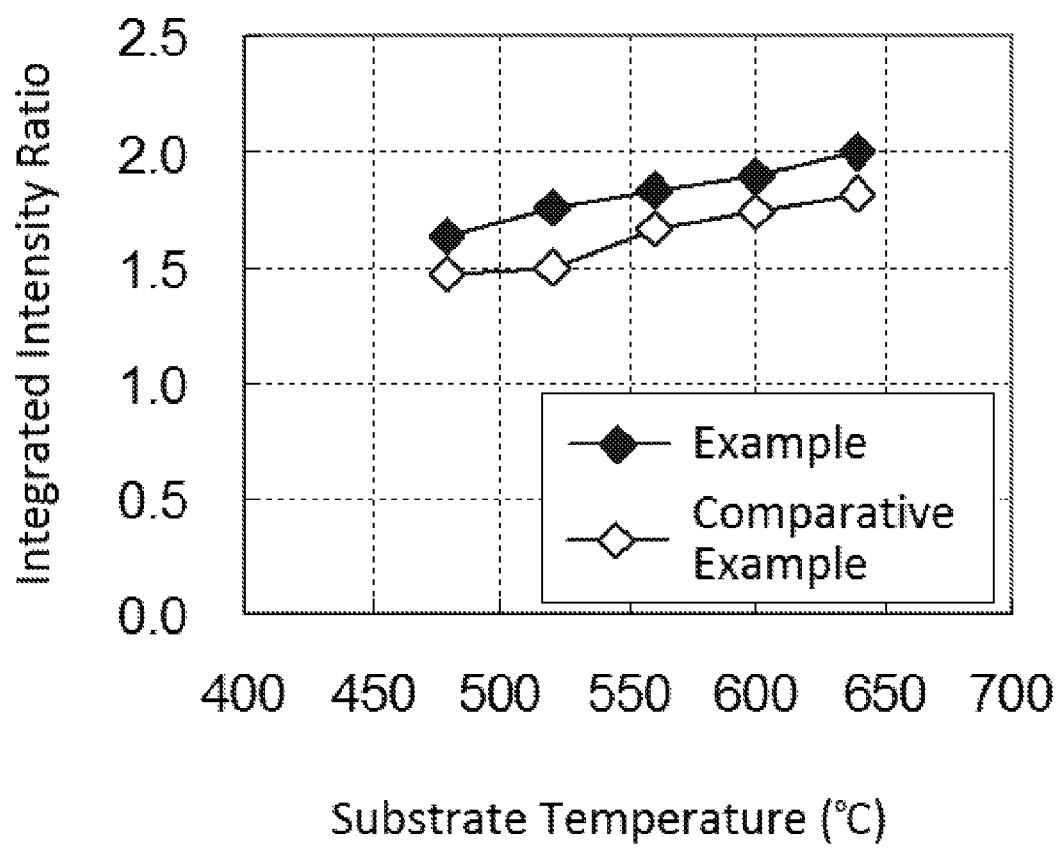
FIG. 2 is a graph showing the dependency on substrate temperature of the integrated intensity ratio of the magnetic recording medium in an embodiment of the present invention.

When X-ray diffraction measurements were made for the media of this example, only an $L1_0$-FePt (001) peak, and a mixed peak of an $L1_0$-FePt (002) peak and an FCC-FePt (200) peak were observed from all the magnetic layers of all media. Accordingly, the FePt alloy in the magnetic layer is considered to have a good (001) orientation by epitaxial growth. In FIG. 2, the ratio of the integrated intensity of the (001) peak to the integrated intensity of the mixed peak of the (002) peak and the (200) peak is plotted as a function of the substrate temperature. The above-mentioned integrated intensity ratio is an index representing the regularity of the $L1_0$-FePt alloy in the magnetic layer and shows that the higher the value, the better the regularity. For comparison, the values for the medium of comparative example in which an MgO foundation layer is formed are also shown in this graph. For both the media of example and comparative example, the integrated intensity ratio increases as the substrate temperature is elevated, but the medium of example showed a value which is greater by about 0.15 to 0.25 irrespective of the substrate temperature. This indicates that the medium of example has a better regularity of the $L1_0$-FePt alloy in the magnetic layer.

Figure 3:
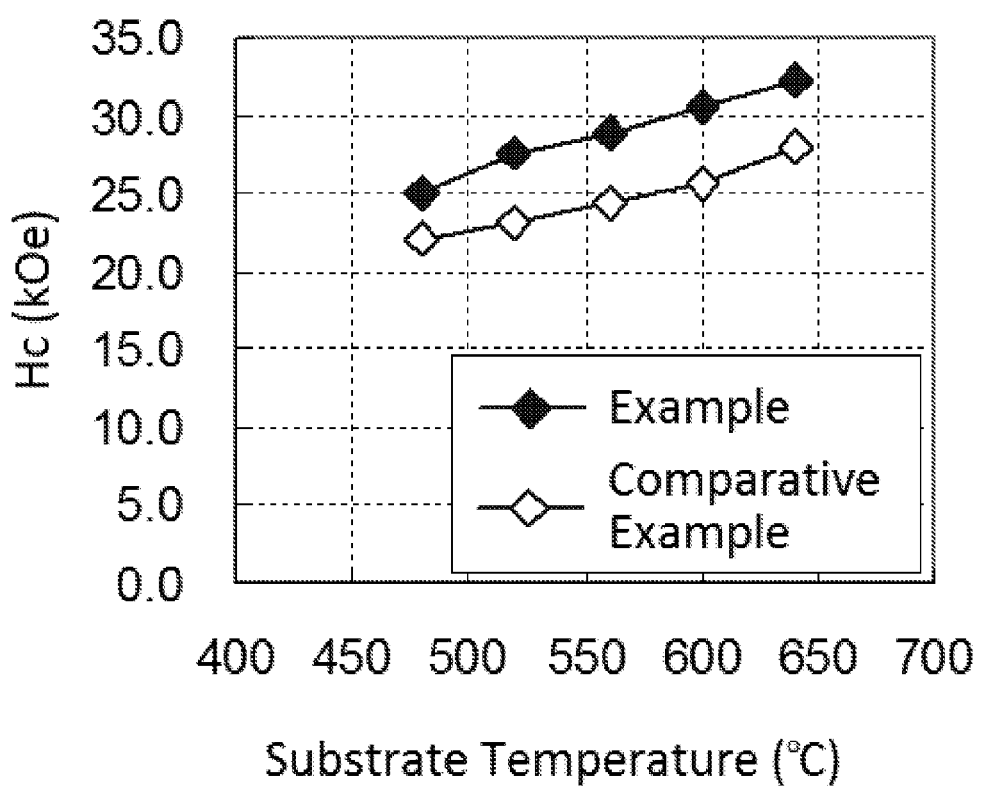
FIG. 3 is a graph showing the dependency on substrate temperature of the magnetic coercive force of the magnetic recording medium in an embodiment of the present invention.

FIG. 3 shows the dependency on substrate temperature of the magnetic coercive forces Hc of the media of example and comparative example. The Hc was estimated from a loop measured at room temperature by applying a maximum magnetic field of 7 T using PPMS. For both the media of example and comparative example, the Hc increases as the substrate temperature is elevated, but the medium of example shows a value which is greater by about 3 to 5 kOe irrespective of the substrate temperature. In particular, the medium of example prepared with the substrate temperature of 600° C. or higher showed a high Hc of 30 kOe or greater. Accordingly, it has been found that by using an MnO foundation layer instead of MgO, a heat-assisted medium having an improved regularity and a higher Hc is obtained.

EXAMPLE 2

With a film structure similar to that of Example 1, 5 nm Mo-20 at % Cr (Example 2.1), W-20 at % V (Example 2.2), Ta-50 at % Mo (Example 2.3), Nb-50 at % W (Example 2.4), Mo (Example 2.5), W (Example 2.6), Ta (Example 2.7) and Nb (Example 2.8) were formed between a Cr-5 at % foundation layer and an MnO foundation layer as a stress introducing layer. Here, the substrate heating temperature after formation of the MnO foundation layer was 560° C.

When X-ray diffraction measurements were made for the media of this example, only an $L1_0$-FePt (001) peak, and a mixed peak of an $L1_0$-FePt (002) peak and an FCC-FePt (200) peak were observed from all the magnetic layers of all media. Accordingly, the FePt alloy in the magnetic layer is considered to have a good (001) orientation by epitaxial growth like the medium shown in Example 1 in which no orientation introducing layer was formed.

Table 1 shows the ratios of the integrated intensity of the (001) peak to the integrated intensity of the mixed peak of the (002) peak and the (200) peak, and Hc values for the media of this example. Here, the Hc was estimated by a method similar to that of Example 1. This table also shows the values for the medium (Example Medium 1) where no stress introducing layer was formed and a magnetic layer was formed after heating the substrate at 560° C. The integrated intensity for the media of this example (Example Media 2.1 to 2.8) was higher than that of the medium of comparative example in which no stress introducing layer was formed, and the Hc was greater by about 1 to 5 kOe.

Table 1 also shows the lattice constants of stress introducing layers used in this example. Since the stress introducing layer in this example had a small thickness of 5 nm and no clear diffraction peak was found in the X-ray diffraction profile, the lattice constant could not be experimentally estimated. Accordingly, the lattice constant of the stress introducing layer adopted literature values for Mo, W, Nb and Ta, and was estimated by the Vegard's law using the literature values for Mo-20 at % Cr, W-20 at % V, Ta-50 at % Mo and Nb-50 at % W. Mo—Cr, W—V, Ta—Mo and Nb—W are complete solid solution alloys, and therefore the lattice constant can be estimated by the Vegard's law. Example Medium 2.2, Example Medium 2.5 and Example Medium 2.6 each having a lattice constant of 0.31 nm or greater and less than 0.32 particularly have a high integrated intensity ratio and show a high Hc. This is considered to result from the introduction of a moderate tensile stress into the FePt alloy in the magnetic layer through the MnO foundation layer. The slightly decreased integrated intensity ratio for Example Medium 2.3, Example Medium 2.4, Example Medium 2.7 and Example Medium 2.8 having the lattice constant increased to 0.32 nm or greater is considered to result from the increased lattice misfit. However, it can be understood that even these media have a high integrated intensity ratio and a better regularity of the $L1_0$-FePt alloy in the magnetic layer as compared to Example Medium 1 in which no stress introducing layer is formed. Accordingly, it has been found that by forming an MnO foundation layer on a stress introducing layer consisting of a BCC metal or BCC alloy having a lattice constant of 0.3 nm or greater, a heat-assisted medium having the further improved regularity of the FePt alloy in the magnetic layer and showing a high Hc is obtained. Furthermore, it has been found that with the lattice constant of the stress introducing layer being 0.31 nm or greater and less than 0.32 nm, particularly the regularity is improved and the Hc can be further increased.

TABLE 1

| | Stress introducing layer | Integrated intensity ratio | Hc (kOe) | Lattice constant (nm) |
|---|---|---|---|---|
| Example 2.1 | Mo—20 at % Cr | 2.11 | 31.1 | 0.309 |
| Example 2.2 | W—30 at % V | 2.35 | 32.7 | 0.312 |
| Example 2.3 | Ta—50 at % Mo | 2.18 | 29.9 | 0.322 |
| Example 2.4 | Nb—50 at % W | 2.17 | 30.8 | 0.324 |
| Example 2.5 | Mo | 2.28 | 33.1 | 0.315 |
| Example 2.6 | W | 2.37 | 32.2 | 0.317 |
| Example 2.7 | Ta | 2.07 | 29.8 | 0.330 |
| Example 2.8 | Nb | 2.01 | 30.2 | 0.331 |
| Example 1 | — | 1.84 | 28.8 | — |

EXAMPLE 3

Figure 4:
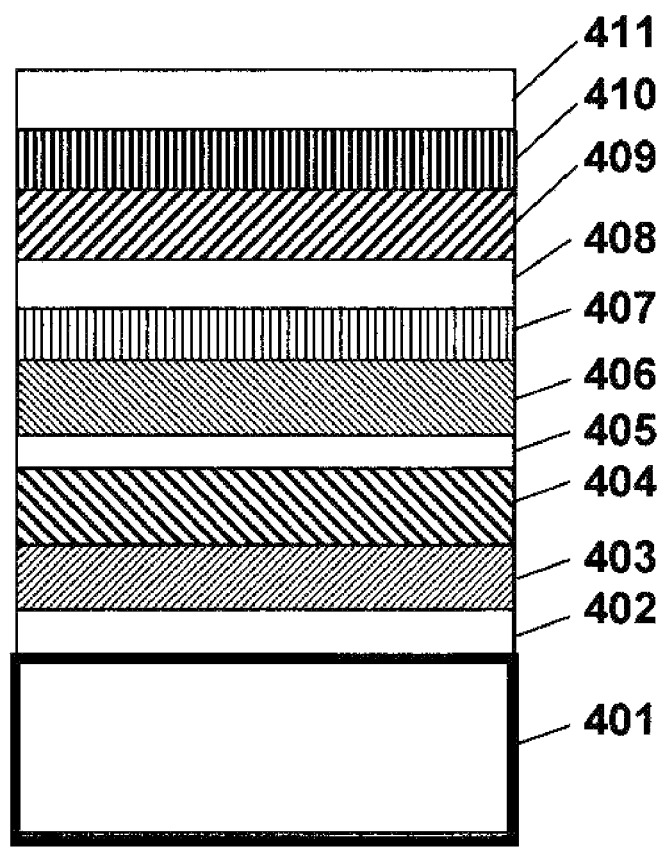
FIG. 4 is a drawing showing one example of the layer structure of the magnetic recording medium in an embodiment of the present invention.

FIG. 4 shows one example of the layer structure of the magnetic recording medium prepared in this example. In this example, a 5 nm Cr-50 at % Ti adhesive layer 402, a 40 nm Ag-3 at % Pd heat sink layer 403, a 20 nm Fe-8 at % Ta-12 at % C soft magnetic foundation layer 404 and a 5 nm Co-50 at % Ti foundation layer 405 were formed on a glass substrate 401, followed by heating the substrate at 220° C. Thereafter, a 10 nm Cr-15 at % Mn foundation layer 406, a 2 nm MgO foundation layer 407 and a 2 nm MnO foundation layer 408 were formed, and the substrate was heated at 600° C. Thereafter, a 10 nm (Fe-50 at % Pt)-12 mol % $SiO_2$-8 mol % $TiO_2$ magnetic layer 409 was formed, and a 4 nm Co-12 at % Cr-18 at % Pt cap layer 410 and a DLC protective film 411 were further formed. Here, the MnO foundation layer was formed by RF sputtering using an MnO composite target. Furthermore, as a comparative example, a medium was prepared in which no MnO foundation layer was formed.

When X-ray diffraction measurements were made for the media of this example, only an $L1_0$-FePt (001) peak, and a mixed peak of an $L1_0$-FePt (002) peak and an FCC-FePt (200) peak were observed from all the magnetic layers of all media. The ratio of the integrated intensity of the former peak to the integrated intensity of the latter mixed peak was 2.01. The integrated intensity ratio for the comparative example medium in which no MnO was formed was 1.67.

Table 2 shows the values of the magnetic coercive force Hc and magnetic coercive force distribution ΔHc/Hc for the medium of this example and the medium of comparative example. Here, ΔHc/Hc was measured by a method as described in "IEEE Trans. Magn., vol. 27, pp 4975-4977, 1991". Specifically, in a major loop and a minor loop measured at room temperature by applying a maximum magnetic field of 7 T, the magnetic field with the value of magnetization being 50% of the saturation value was measured, and from a difference between both the values, ΔHc/Hc was calculated with the assumption that the Hc distribution is a Gaussian distribution. ΔHc/Hc is a parameter which corresponds to a reversal field distribution, and this value being lower results in a higher medium SNR, and is therefore desirable. The medium of this example in which an MnO foundation layer was formed had a Hc greater by 6.8 kOe and showed a value of ΔHc/Hc lower by about 16% as compared to the medium of comparative example. This is considered to result from the improvement of the regularity. Accordingly, it has been found that by forming an MnO foundation layer on an MgO foundation layer, a heat-assisted medium having a high Hc and a low Hc distribution is obtained.

Even when the stress introducing layer shown in Example 2 was introduced just below the MgO foundation layer of the medium of this example, the regularity of the magnetic layer was improved, and the Hc was increased by about 1 to 5 kOe.

TABLE 2

| | Foundation layer | Hc (kOe) | ΔHc/Hc |
|---|---|---|---|
| Example 3 | MnO foundation layer present | 32.2 | 0.37 |
| Comparative Example 3 | MnO foundation layer absent | 25.4 | 0.44 |

EXAMPLE 4

With a layer structure identical to that of Example 3, a medium was prepared in which Cr-5 at % Ti (Example 4.1), Cr-20 at % V (Example 4.2), Cr-12 at % Mo (Example 4.3), Cr-10 at % W (Example 4.4), Cr-10 at % Mn (Example 4.5), Cr-2 at % Ru (Example 4.6), Cr-5 at % Ti-2 at % B (Example 4.7), Cr-5 at % Mo-2 at % C (Example 4.9), Cr-5 at % Mn-2 at % B (Example 4.8) and Cr-5 at % Ru-2 at % C (Example 4.10) were formed as a foundation layer just below the MgO foundation layer.

When X-ray diffraction measurements were made for the media of this example, only an $L1_0$-FePt (001) peak, and a mixed peak of an $L1_0$-FePt (002) peak and an FCC-FePt (200) peak were observed from all the magnetic layers of all media. The ratio of the integrated intensity of the former peak to the integrated intensity of the latter mixed peak was 2 or greater for all example media. Accordingly, it has been found that the FePt alloy in the magnetic layer of the medium of this example has a good (001) orientation and a good $L1_0$ regularity.

Table 3 shows the Hc and ΔHc/Hc for the media of this example. Media using Cr-12 at % Mo and Cr-10 at % W foundation layers showed an especially high Hc. Furthermore, media using Cr-5 at % Ti-2 at % B, Cr-5 at % Mo-2 at % C, Cr-5 at % Mn-2 at % B and Cr-5 at % Ru-2 at % C foundation layers to which B or C was added showed especially low ΔHc/Hc, and it has been found that addition of B or C to the foundation layer is effective for reduction of the Hc distribution.

TABLE 3

| | Foundation layer | Hc (kOe) | ΔHc/Hc |
|---|---|---|---|
| Example 4.1 | Cr—5 at % Ti | 31.2 | 0.39 |
| Example 4.2 | Cr—20 at % V | 29.7 | 0.40 |
| Example 4.3 | Cr—12% Mo | 33.2 | 0.36 |
| Example 4.4 | Cr—10 at % W | 34.1 | 0.37 |
| Example 4.5 | Cr—10 at % Mn | 30.2 | 0.38 |
| Example 4.6 | Cr—2 at % Ru | 28.8 | 0.40 |
| Example 4.7 | Cr—5 at % Ti—2 at % B | 29.6 | 0.32 |
| Example 4.8 | Cr—5 at % Mn—2 at % B | 28.2 | 0.34 |
| Example 4.9 | Cr—5 at % Mo—2 at % C | 28.8 | 0.33 |
| Example 4.10 | Cr—5 at % Ru 2 at % C | 30.5 | 0.33 |

EXAMPLE 5

Figure 5:
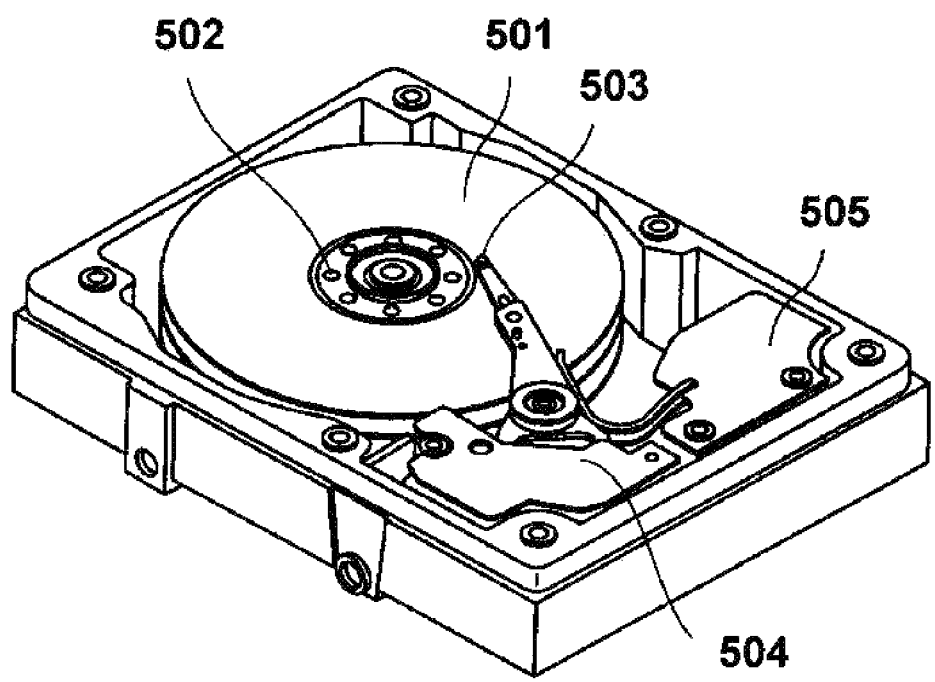
FIG. 5 is a perspective view of a magnetic storage device in an embodiment of the present invention.
Figure 6:
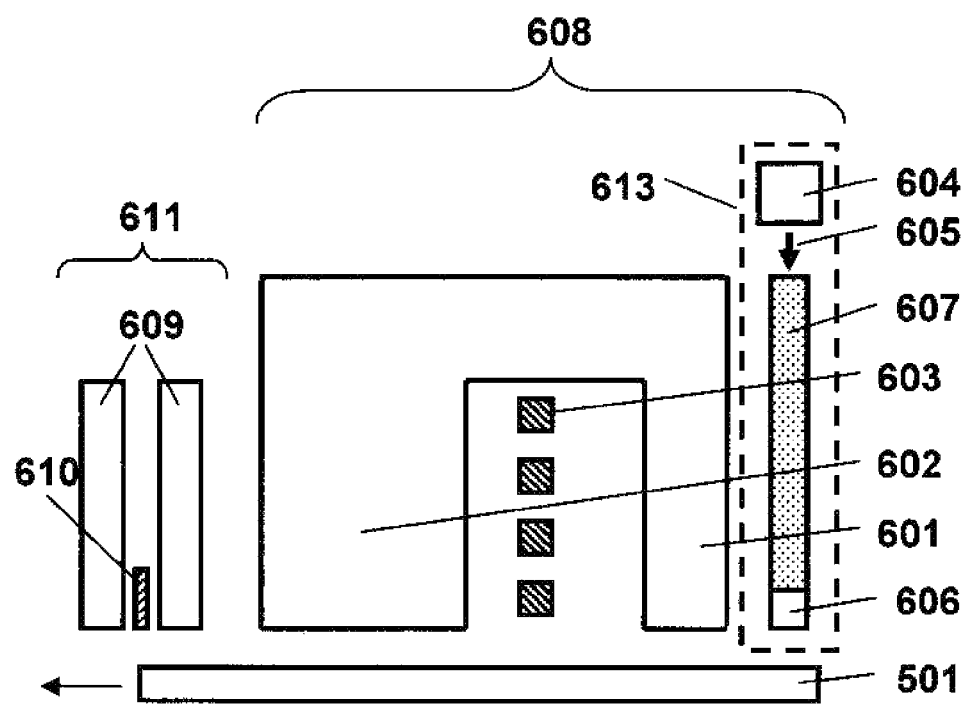
FIG. 6 is a drawing showing a magnetic head in an embodiment of the present invention.

The media shown in Example 3 (Example Medium 3 and Comparative Example Medium 3) and the media shown in Example 4 (Example Media 4.1 to 4.10) were coated with a perfluoropolyether-based lubricant and then incorporated into a magnetic storage device shown in FIG. 5. This magnetic storage device includes a magnetic recording medium 501, a driving section 502 for rotating the magnetic recording medium, a magnetic head 503, a driving section 504 for moving the head and a record regeneration signal processing system 505. FIG. 6 shows details of the magnetic head. The head consists of a main magnetic pole 601, an auxiliary magnetic pole 602, a coil 603 for generating a magnetic field, a laser diode LD 604, a recording head 608 including a waveguide 607 for transmitting a laser beam 605 generated from the LD to a near-field generating element 606, and a regeneration head 611 including a regeneration element 610 held between shields 609. The medium 501 can be heated by near-field light generated from the near-field light element to reduce the magnetic coercive force of the medium to a head magnetic field or lower to perform recording.

Table 4 shows SNR and overwrite properties OW where signals of 1200 kFCI were recorded and record regeneration properties were evaluated. Here, the LD power at the time of recording was adjusted so that the recording track width defined as a half-value width of a track profile was 70 nm. Example Medium 3 and Example Media 4.1 to 4.10 each showed high SNR of 16 dB or greater and high OW of 30 dB or greater. Comparative Example Medium 3 had SNR lower by 2 dB or greater as compared to the above-mentioned medium and OW of 30 dB or less. Accordingly, it has been found that by depositing an MnO foundation layer on an MgO foundation layer, a heat-assisted medium having high SNR and showing good OW properties is obtained.

Among Example Media 4.1 to 4.10, Example Media 4.7 to 4.10 having particularly small ΔHc/Hc showed high SNR of 16.7 dB or greater. Furthermore, Example Medium 4.1 and Example Medium 4.5 showed particularly high OW properties. Accordingly, it has been found that for increasing OW properties, it is desirable to form a CrTi foundation layer or a CrMn foundation layer just below the MnO foundation layer.

TABLE 4

|  | SNR (dB) | OW (dB) |
| --- | --- | --- |
| Example 3 | 16.4 | 35.6 |
| Comparative Example 3 | 13.9 | 29.3 |
| Example 4.1 | 16.2 | 35.1 |
| Example 4.2 | 16.4 | 33.3 |
| Example 4.3 | 16.1 | 32.1 |
| Example 4.4 | 16.3 | 33.5 |
| Example 4.5 | 16.4 | 35.5 |
| Example 4.6 | 16.5 | 32.5 |
| Example 4.7 | 16.7 | 34.1 |
| Example 4.8 | 16.9 | 33.9 |
| Example 4.9 | 16.8 | 32.1 |
| Example 4.10 | 16.7 | 31.8 |

Obviously, numerous modifications and variations of the present invention are possible in light of the above teachings. It is therefore to be understood that within the scope of the appended claims, the invention may be practiced otherwise than as specifically described herein.

What is claimed is:

1. A heat-assisted magnetic recording medium comprising:
a substrate;
a plurality of foundation layers provided on the substrate and including a first foundation layer containing MnO; and
a magnetic layer provided on the plurality of foundation layers and including an alloy as a main ingredient, the alloy having an $L1_0$ structure.

2. The heat-assisted magnetic recording medium according to claim 1, wherein the first foundation layer is provided on a second foundation layer consisting of Cr or consisting of an alloy which contains Cr as a main ingredient and at least one of Ti, V, Mo, W, Mn and Ru, the second foundation layer having a body-centered cubic lattice structure.

3. The heat-assisted magnetic recording medium according to claim 1, wherein the first foundation layer is provided on a second foundation layer consisting of an alloy which contains Cr as a main ingredient, at least one of Ti, V, Mo, W, Mn and Ru, and further at least one of B and C, the foundation layer having a body-centered cubic lattice structure.

4. The heat-assisted magnetic recording medium according to claim 1, wherein the first foundation layer is provided on a second foundation layer consisting of Mo, W, Ta, Nb or an alloy which contains at least one of Mo, W, Ta and Nb, the foundation layer having a body-centered cubic lattice structure which has a lattice constant of 0.3 nm or greater.

5. The heat-assisted magnetic recording medium according to claim 1, wherein the first foundation layer is provided on a second foundation layer having a B2 structure and consisting of NiAl or RuAl.

6. The heat-assisted magnetic recording medium according to claim 1, wherein the plurality of foundation layers include a third foundation layer consisting of MgO, and the first foundation layer is provided on the third foundation layer.

7. The heat-assisted magnetic recording medium according to claim 6, wherein the third foundation layer is provided on a second foundation layer consisting of Cr or consisting of an alloy which contains Cr as a main ingredient and at least one of Ti, V, Mo, W, Mn and Ru, the second foundation layer having a body-centered cubic lattice structure.

8. The heat-assisted magnetic recording medium according to claim 6, wherein the third foundation layer is provided on a second foundation layer consisting of an alloy which contains Cr as a main ingredient, at least one of Ti, V, Mo, W, Mn and Ru, and further at least one of B and C, the second foundation layer having a body-centered cubic lattice structure.

9. The heat-assisted magnetic recording medium according to claim 6, wherein the third foundation layer is provided on a second foundation layer consisting of Mo, W, Ta, Nb or an alloy which contains at least one of Mo, W, Ta and Nb, the second foundation layer having a body-centered cubic lattice structure which has a lattice constant of 0.3 nm or greater.

10. The heat-assisted magnetic recording medium according to claim 6, wherein the third foundation layer is provided on a second foundation layer having a B2 structure and consisting of NiAl or RuAl.

11. The heat-assisted magnetic recording medium according to claim 1, wherein the magnetic layer has an $L1_0$ structure, and contains an FePt or CoPt alloy as a main ingredient and further contains $SiO_2$, $TiO_2$, $Cr_2O_3$, $Al_2O_3$, $Ta_2O_5$, $ZrO_2$, $Y_2O_3$, $CeO_2$, MnO, TiO, ZnO, C or a combination thereof.

12. magnetic storage device comprising:
the heat-assisted magnetic recording medium according to claim 1;
a magnetic recording medium driving device to rotate the heat-assisted magnetic recording medium;
a magnetic head comprising:
a laser generator to generate a laser beam;
a near-field light generator mounted at an end of the magnetic head and to generate near-field light which heats the heat-assisted magnetic recording medium upon reception of the laser beam; and
a waveguide to guide the laser beam to the near-field light generator;
a magnetic head driving device to move the magnetic head; and
a record regeneration signal processing device.

* * * * *